Sept. 7, 1948. N. CROMBACH 2,448,865
DENTAL WELDING MACHINE
Filed May 16, 1947

INVENTOR.
Nicholas Crombach
BY
Att'y

Patented Sept. 7, 1948

2,448,865

UNITED STATES PATENT OFFICE 2,448,865

DENTAL WELDING MACHINE

Nicholas Crombach, San Francisco, Calif.

Application May 16, 1947, Serial No. 748,466

1 Claim. (Cl. 219—4)

This invention relates to improvements in welding devices and has particular reference to a device for welding dental plates and similar small objects requiring accurate positioning and welding.

The principal object of this invention is to produce a device of this character wherein the operator may accurately manipulate and hold the part in welding position, thereby manipulating the welding contacts with the same hand which is holding the parts to be welded.

A further object of this invention is to produce a device of this character which may be readily transported, one which requires a minimum amount of space and one which may be adjusted for various welding temperatures.

A still further object is to produce a device of this character which is economical to manufacture.

Other objects and advantages will be apparent during the course of the following description.

Figure 1:
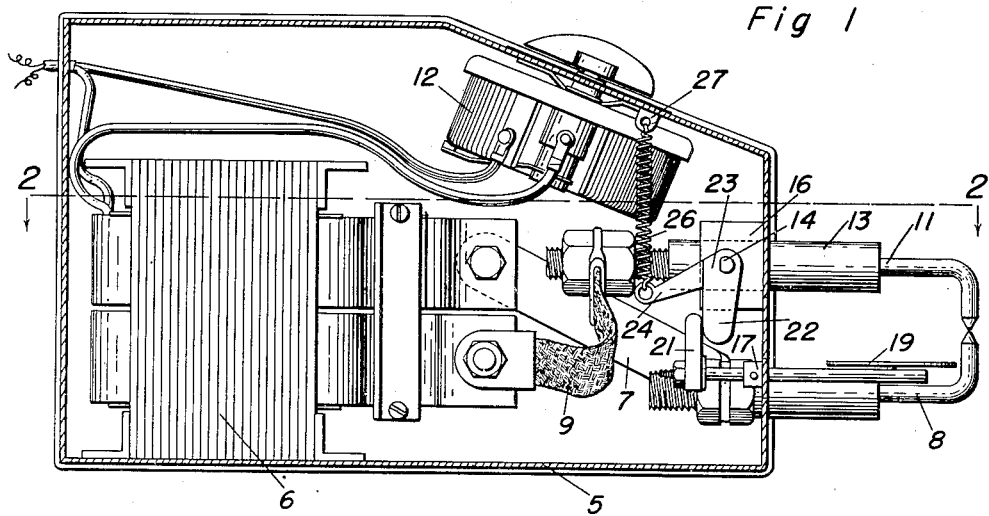
Figure 2:
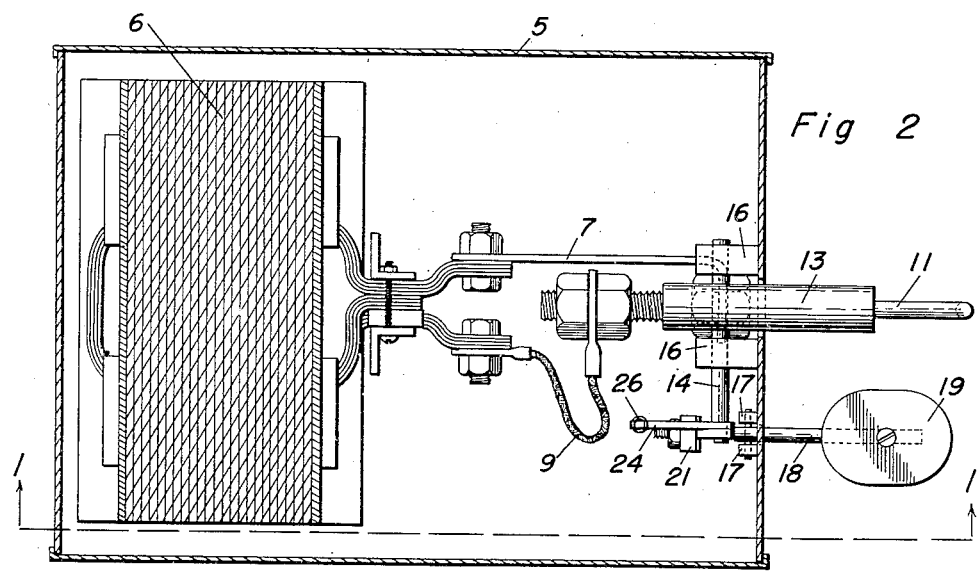

In the accompanying drawings forming a part of this specification and in which like numerals are employed to designate like parts throughout the same, Fig. 1 is a cross sectional view taken on the line 1—1 of Fig. 2, and Fig. 2 is a cross sectional view taken on the line 2—2 of Fig. 1.

In dental work it is often necessary to do spot welding on extremely small parts and upon different metals such as gold, silver, stainless steel, etc., which minute parts must be held in the hand and manipulated in certain ways in order that the weld will create a proper bond.

Heretofore the welding machines have been of a nature whereby heavy contacts precluded the welding on small parts and the contacts were generally moved toward each other through the use of a foot pedal being far from sensitive and resulting in poor welds being executed.

Applicant has devised a welder wherein the same hand which holds the article to be welded manipulates the moving of the contacts toward and away from each other with delicacy and accuracy not possible with the use of a foot pedal.

In the accompanying drawings wherein for the purpose of illustration is shown a preferred embodiment of my invention, the numeral 5 designates a casing having the customary welding transformer 6 which furnishes current through a bus bar 7 to an electrode 8. A flexible bus 9 connects the transformer with a movable electrode 11.

A rheostat is shown at 12 which regulates the amount of flow of current to the primary of the transformer 6, and consequently the output of the secondary to the electrodes.

The electrode 11 is slidably mounted in a holder 13 which is mounted on a shaft 14, journaled in blocks 16 formed upon the face of the case 5.

Also mounted on the face of the case are bearing blocks 17 which serve to pivotally mount an arm 18 having a hand rest 19 secured to its outer end and having a pusher 21 secured to its inner end. This pusher in turn engages the arm 22 of a bell crank lever 23 secured to the shaft 14. The other arm 24 of the bell crank lever has a spring 26 secured thereto, the opposite end of the spring being secured as at 27 to the cover of the casing 5.

The result of this construction is that the spring 26 normally keeps the lever 22 in engagement with the pusher 21, thus holding the same in the position shown in Fig. 1.

This spring also causes the shaft 14 to rotate the holder 13 so as to move the electrodes 11 and 8 into engagement with each other.

A foot switch may be used to control the flow of current to the machine so that when the two electrodes are in engagement with each other there will be no flow of current therebetween until the foot switch is closed.

Now, assuming that it is desired to weld a small part of some nature, the part is held in the hand and the hand is then rested upon the plate 19 which is forced downwardly, causing the pusher 21 to move the bell crank lever 22 in a counter-clockwise direction and against the tension of the spring 26.

This movement of the bell crank lever and its attached shaft 14 will cause the holder 13 and the electrode 11 to move in a counter-clockwise direction, thus spreading the electrode points.

By now placing the part to be welded between the electrodes and permitting the electrodes to again touch the part at exactly the point where it is desired to cause the weld to be formed, the weld may be accomplished by lifting the pressure of the hand from the plate 19 until engagement of the electrodes has taken place, after which closing of the foot pedal will cause the welding current to pass through the article to be welded.

Thus, it will be seen that I have produced a device wherein welding may be accomplished upon delicate parts.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

In a device of the character described a casing, a welding transformer positioned in said casing, a pair of electrodes mounted in said casing, one of said electrodes being stationary, the other of said electrodes being pivoted, a pivoted arm mounted parallel to said stationary electrode, a plate secured to said arm, a pusher secured at the opposite end of said arm from said plate and engaging a bell crank lever, said bell crank lever being connected to said pivoted electrode, and spring means maintaining said bell crank lever in engagement with said pusher whereby downward movement on said plate will cause said pusher to move said bell crank lever and its attached electrode away from said stationary electrode.

NICHOLAS CROMBACH.

REFERENCES CITED

The following references are of record in the file of this patent:

UNITED STATES PATENTS

| Number | Name | Date |
|---|---|---|
| 2,009,647 | Brusse et al. | July 30, 1935 |
| 2,130,657 | Watkin | Sept. 20, 1938 |

FOREIGN PATENTS

| Number | Country | Date |
|---|---|---|
| 398,442 | Great Britain | Sept. 14, 1933 |
| 797,154 | France | Feb. 3, 1936 |